(12) United States Patent
Lindquist

(10) Patent No.: US 9,118,683 B2
(45) Date of Patent: Aug. 25, 2015

(54) DIFFERENTIATING IPTV NOTIFICATIONS

(75) Inventor: Jan Erik Lindquist, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 277 days.

(21) Appl. No.: 13/389,615

(22) PCT Filed: Sep. 14, 2010

(86) PCT No.: PCT/SE2010/050982
§ 371 (c)(1),
(2), (4) Date: Feb. 9, 2012

(87) PCT Pub. No.: WO2011/037520
PCT Pub. Date: Mar. 31, 2011

(65) Prior Publication Data
US 2012/0143976 A1    Jun. 7, 2012

Related U.S. Application Data

(60) Provisional application No. 61/244,654, filed on Sep. 22, 2009.

(51) Int. Cl.
*G06F 15/16* (2006.01)
*H04L 29/06* (2006.01)
(Continued)

(52) U.S. Cl.
CPC .......... *H04L 65/1016* (2013.01); *H04L 65/105* (2013.01); *H04L 65/1006* (2013.01);
(Continued)

(58) Field of Classification Search
CPC ............ H04L 65/10016; H04L 65/1006; H04L 29/06224; H04L 12/581; H04N 21/625; H04N 21/6175; H04N 21/64322
USPC ................................................ 709/206, 205
See application file for complete search history.

(56) References Cited

U.S. PATENT DOCUMENTS 6,901,067 B1 *  5/2005  Kalavade ................... 370/352
7,702,342 B2 *  4/2010  Duan ........................... 455/466
(Continued)

FOREIGN PATENT DOCUMENTS

| CN | 101483660 | 7/2009 |
|----|-----------|--------|
| WO | WO 2008/015187 | 2/2008 |

OTHER PUBLICATIONS

International Search Report for PCT/SE2010/050982, mailed Dec. 14, 2010.
(Continued)

*Primary Examiner* — Kevin Bates
*Assistant Examiner* — Clarence D McCray
(74) *Attorney, Agent, or Firm* — Nixon & Vanderhye P.C.

(57) ABSTRACT

Methods and arrangements for presenting a received Instant Message comprising an IPTV Notification, e.g. a Program Reminder, and differentiating the IM comprising the IPTV Notification from other Instant Messages received from other users. The differentiation is achieved by the SCF-node (3) (Service Control Function), e.g. an IAP (IPTV Application Platform), including an IARI (IPTV Application Reference Identifier) in an Instant Message comprising an IPTV Notification. The IARI identifies an IPTV Application of the SCF (Service Control Function), and indicates to a UE (1) at the receiving side that the Instant Message comprises IPTV information for presenting an IPTV Notification.

24 Claims, 8 Drawing Sheets

(51) Int. Cl.
*H04N 21/488* (2011.01)
*H04N 21/81* (2011.01)

(52) U.S. Cl.
CPC ........ *H04L65/1043* (2013.01); *H04L 65/4076* (2013.01); *H04L 65/4084* (2013.01); *H04N 21/4882* (2013.01); *H04N 21/8126* (2013.01)

(56) References Cited

U.S. PATENT DOCUMENTS

| | | | |
|---|---|---|---|
| 7,797,379 B2* | 9/2010 | Hawkins | 709/203 |
| 7,987,490 B2* | 7/2011 | Ansari et al. | 725/82 |
| 8,111,712 B2* | 2/2012 | Mutikainen et al. | 370/466 |
| 8,191,100 B2* | 5/2012 | Lindquist et al. | 725/110 |
| 8,266,664 B2* | 9/2012 | Qiu et al. | 725/109 |
| 8,374,172 B2* | 2/2013 | Jana et al. | 370/352 |
| 8,490,143 B2* | 7/2013 | Cedervall et al. | 725/109 |
| 8,516,529 B2* | 8/2013 | Lajoie et al. | 725/87 |
| 2002/0010922 A1 | 1/2002 | Darin et al. | |
| 2004/0034873 A1 | 2/2004 | Zenoni | |
| 2007/0100981 A1* | 5/2007 | Adamczyk et al. | 709/223 |
| 2008/0098228 A1* | 4/2008 | Anderson et al. | 713/172 |
| 2008/0162637 A1* | 7/2008 | Adamczyk et al. | 709/204 |
| 2008/0181377 A1 | 7/2008 | Qiu et al. | |
| 2009/0013361 A1* | 1/2009 | Oh et al. | 725/109 |
| 2009/0025034 A1* | 1/2009 | Modiri et al. | 725/43 |
| 2009/0119699 A1* | 5/2009 | Crassous et al. | 725/25 |
| 2009/0282458 A1* | 11/2009 | Hjelm | 726/1 |
| 2009/0290690 A1* | 11/2009 | Fan et al. | 379/88.13 |
| 2009/0300115 A1* | 12/2009 | Postmus | 709/205 |
| 2009/0307736 A1* | 12/2009 | Lindquist et al. | 725/110 |
| 2009/0327488 A1* | 12/2009 | Sampat et al. | 709/224 |
| 2010/0031290 A1* | 2/2010 | Hua et al. | 725/39 |
| 2010/0146570 A1* | 6/2010 | Kim et al. | 725/109 |
| 2010/0153453 A1* | 6/2010 | Knowles | 707/784 |
| 2010/0235856 A1* | 9/2010 | Huang | 725/25 |
| 2010/0254370 A1* | 10/2010 | Jana et al. | 370/352 |
| 2010/0257273 A1* | 10/2010 | Mutikainen et al. | 709/227 |
| 2010/0287602 A1* | 11/2010 | Xia | 726/5 |
| 2011/0035780 A1* | 2/2011 | Cedervall et al. | 725/110 |
| 2011/0037574 A1* | 2/2011 | Pratt et al. | 340/10.51 |
| 2011/0085082 A1* | 4/2011 | Jing et al. | 348/552 |
| 2011/0103374 A1* | 5/2011 | Lajoie et al. | 370/352 |
| 2011/0107364 A1* | 5/2011 | Lajoie et al. | 725/25 |
| 2011/0131332 A1* | 6/2011 | Bouazizi | 709/227 |
| 2011/0138409 A1* | 6/2011 | Svensson et al. | 725/25 |
| 2011/0154408 A1* | 6/2011 | Svensson et al. | 725/58 |
| 2012/0023530 A1* | 1/2012 | Xia | 725/93 |
| 2012/0143976 A1* | 6/2012 | Lindquist | 709/206 |

OTHER PUBLICATIONS

"Session Merge and IMS services", 3GPP Draft, S2-080565, Jan. 9, 2008, 5 pages.

Draft ETSI TS 182 028, Telecommunications and Internet converged Services and Protocols for Advanced Networking (TISPAN); NGN integrated IPTV subsystem Architecture, Apr. 2009, pp. 1-79.

Levenshteyn et al., "Mobile Services Interworking for IMS and XML WebServices", *IEEE Communications Magazine*, Sep. 2006, pp. 80-87.

Translation of Chinese Search Report dated Feb. 25, 2014 in CN 201080042903.6, 2 pages.

* cited by examiner

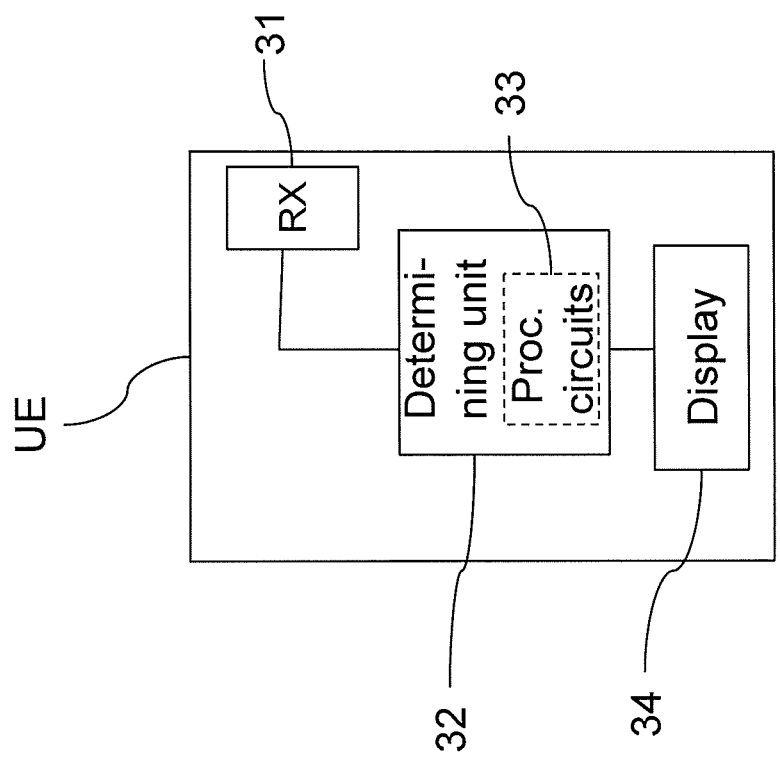

DIFFERENTIATING IPTV NOTIFICATIONS

This application is the U.S. national phase of International Application No. PCT/SE2010/050982 filed 14 Sep. 2010 which designated the U.S. and claims priority to Provisional Application No. 61/244,654 filed 22 Sep. 2009, the entire contents of each of which are hereby incorporated by reference.

TECHNICAL FIELD

The present invention relates to methods for a User Equipment (UE) and for a Service Control Function-node (SCF-node) of presenting an IPTV (Internet Protocol Television) notification on a UE. The invention also relates to a User Equipment and an SCF-node.

BACKGROUND

The TV media may today be organized in a two-way interactive communication network, and it is not limited to the conventional one-way distribution to the viewers. Further, TV may be watched anywhere, on different types of screens, such as e.g. on a PC, and not only on a conventional TV-screen. This development of the TV media enables new services, e.g. involving interactivity by the viewer. Interactivity through wireline and wireless two-way networks enables a viewer to participate, e.g. to vote in a TV show, to buy products by interacting with advertisements, and to send personal messages, e.g. to a TV show. A viewer could also receive personalized ads by targeted advertising, receive a personalized listing of TV programs in an electronic program guide (EPG), and personalized program content information adapted to the profile of the viewer.

The IPTV (Internet Protocol Television) offers new opportunities for telecommunication service providers to compete with cable television operators, satellite-TV operators, and other terrestrial television service providers in order to attract customers. The so-called "triple play" is a bundled offering of Internet, telephone and IPTV-services, which is designed to attract new customers, and to retain existing customers.

In IPTV, media services may be provided through wireline and wireless telephone networks using web browser technology, such that a viewer is able to watch specific Internet pages accessible by a web browser. Conventionally, each Internet page is identified by a Uniform Resource Identifier (URI) or a similar page address.

In general, IPTV is a system for receiving and displaying multimedia streams encoded as a series of IP data packets. The Open IPTV Forum is currently specifying an end-to-end platform for supplying multimedia and IPTV services to UEs over the Internet and managed networks having controlled quality-of-service (QoS) performance, using the IP Multimedia Subsystem (IMS) architecture specified by the Third Generation Partnership Project (3GPP). A UE could access services both by a wireline-connection, e.g. by the Ethernet, a cable modem, or a digital subscriber line, and wirelessly, e.g. by a 3GPP-specified cellular user device.

Thus, a viewer may access IMS (Internet Protocol Multimedia Sub-system)-based IPTV (Internet Protocol Television)-services, on different types of UEs (User Equipments), such as e.g. a TV, an STB (Set-Top Box), a PC (Personal Computer) or a mobile phone, provided that the UE has suitable functionality, e.g. is OITF (Open IPTV-Forum)-enabled.

The IMS uses the Session Initiation Protocol (SIP) and the Session Description Protocol (SDP) as its basic signalling mechanisms. The SIP is a mechanism defined by the Internet Engineering Task Force (IETF) for finding endpoints and routing control signals between them and is a set of simple operations, including REGISTER, INVITE, ACK, and BYE, and the SDP is a protocol for declaring media. In IMS networks, the media transport is based e.g. on the real-time transport protocol (RTP).

In order to access an IMS-based IPTV service through a conventional IMS-architecture, a UE registers in a serving call session control function (S-CSCF), which is an IMS core node and basically corresponds to a SIP server. The IMS-architecture may also comprise a number of access nodes, including a proxy CSCF (P-CSCF), a media gateway control function (MGCF), and one or more border gateways (BGs), that mediate UE-access to the core nodes, and through them to media content residing on media servers. The UE may include an IP multimedia subscriber identity module (ISIM), which is an application, or a computer program, residing on a universal integrated circuit card (UICC) that enables the UE to register and access the IMS. The ISIM is typically pre-configured with parameters necessary to initiate the UE's registration to the IMS, including a private user identity, one or more public user identities, and a home network domain name.

There are a number of IMS services defined for the IMS, e.g. the above described IPTV-service, as well as a Messaging-service. The IMS IPTV service enables set-up of a Video-on-Demand session or a broadcast session, reserving network resources, e.g. bandwidth, and ensuring that the source of the media stream is set-up correctly.

The IMS Messaging-service, denoted Instant Messaging (IM) according to the OMA (Open Mobile Alliance), enables an end-user to receive an instant message on any IMS-connected terminal, e.g. a mobile, PC or Set Top Box (STB). Thus, if an instant message (IM) is sent to an end-user, the message will be received on all IMS-connected devices belonging to the end-user. Instant messaging could be described as real-time communication between two or more users, based on typed text, e.g. over the Internet.

For IPTV services, it would be an advantage to be able to combine Instant Messages with the IPTV, e.g. for sending program reminders (i.e. IPTV notifications) to an end-user.

However, a drawback with using instant messaging for IPTV notifications is that it is not possible for the end-user to differentiate those notifications from instant messages received from other devices and end-users, without adding complexity to the server that is sending the program reminder. The program reminder, i.e. an IPTV Notification, is typically sent from an IAP (an IPTV application Platform), hereinafter denoted an SCF-node (Service Control Function).

Thus, it still presents a problem to use instant messages for sending IPTV notifications to an end-user, and to differentiate instant messages comprising IPTV notifications from other instant messages at the receiving device.

SUMMARY

An object of the present invention is to address the problems outlined above, and this object and others are achieved by the method and the apparatus according to the appended independent claims, and by the embodiments according to the dependent claims.

According to a first aspect, the invention provides a method for a User Equipment UE, of presenting an IPTV notification. The method comprises receiving an instant message from another device, and detecting an application identifier in the instant message. Further, information is retrieved from the instant message for presenting the IPTV notification, if the application identifier indicates an IPTV application that is associated with a service control function node, SCF-node.

The UE may be IMS-connected, as well as the devices from which the instant messages are received.

The UE may ignore and cancel a received instant message, if no application identifier indicating an IPTV application associated with an SCF-node is detected in the instant message. The method may also comprise displaying the IPTV notification.

The instant message may further comprise an OMA IM feature tag, and said identifier may be an IARI (IMS Application Reference Identifier.)

The retrieval of the information for presenting the IPTV notification may comprise filtering out the instant message from other received instant messages, and parsing the body of the instant message in order to find the information.

Said information may be an URL, which is accessed by a browser associated with the UE.

The method may be preceded by the UE performing a SIP Register, including the IARI and an OMA IM feature tag.

The information for presenting the IPTV notification may have a format that is readable by both the UE and the SCF-node, and the information may comprise different selectable options, e.g. to accept, cancel, record and snooze a notified IPTV program.

The method may further comprise sending a response including a selection of one or more of the different options.

According to a second aspect, the invention provides a method for a service control function node, SCF-node, of presenting an IPTV notification on a User Equipment, the SCF node comprising an IPTV application. The method comprises retrieving an application identifier from the IPTV application, including the application identifier in an instant message, including information related to the presentation in the instant message, and sending the instant message to the User Equipment.

The User Equipment may be IMS-connected, and the information may further be included in the body of the instant message.

According to a third aspect, the invention provides a User Equipment arranged to present an IPTV-notification. The User Equipment comprises a receiver for receiving an instant message from another device, and a determining unit comprising processing circuits. The determining unit is configured to detect an application identifier in the instant message, and retrieve information from the instant message for presenting the IPTV notification, if determining that the application identifier indicates an IPTV application that is associated with an SCF-node.

The User Equipment may be IMS-connectable, and further comprise a display device for presenting the IPTV notification to a user.

The determining unit may comprise a filtering unit for filtering-out an instant message comprising an application identifier indicating an IPTV application associated with an SCF-node from other received instant messages, a parsing unit for parsing the body of a filtered-out instant message, in order to find information for presenting a IPTV notification, and a browsing unit.

The User Equipment may also be IPTV-enabled.

According to a fourth aspect, the invention provides a service control function node, SCF-node, arranged to present an IPTV notification on a User Equipment. The SCF-node comprises an IPTV application, processing circuits configured to retrieve an application identifier from the IPTV application and include said application identifier, as well as information related to the presentation, in an instant message, and a transmitter configured to send the instant message to the User Equipment.

The processing circuits may be further configured to include an OMA IM feature tag in the instant message.

The User Equipment may be IMS-connected, and the SCF-node may correspond to an IAP (IPTV Application Platform).

An advantage with the invention is to enable the use of instant messaging for IPTV notifications, and a differentiation of the instant messages at the receiving device. An advantage with this differentiation is that the end-user does not have to check all instant message received e.g. from friends, in order to find the IPTV notification.

BRIEF DESCRIPTION OF THE DRAWINGS

The present invention will be described in more detail below, and with reference to the accompanying figure, of which:

FIG. 3 illustrates schematically an exemplary User Equipment;

DETAILED DESCRIPTION

Figure 1:
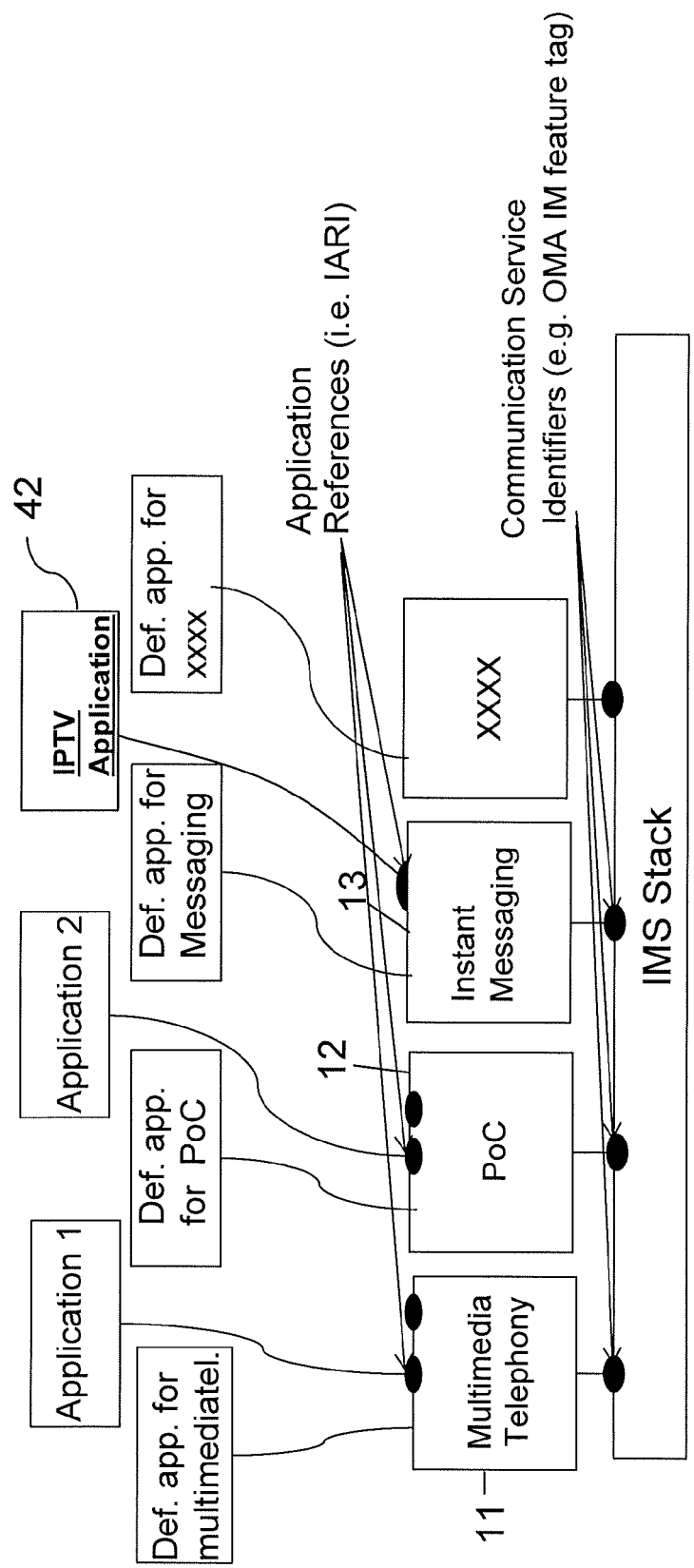
FIG. 1 is a block diagram schematically indicating the use of an IARI (IMS Application Reference Identifier)

In the following, the invention will be described in more detail with reference to certain embodiments and to an accompanying drawing. For the purpose of explanation and not limitation, specific details are set forth, such as particular scenarios, techniques, etc., in order to provide a thorough understanding of the present invention. However, it is apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

Thus, as implied above, it is an object to describe a solution for sending and presenting an IPTV notification to an end-user, using an Instant Message received by a UE, and to differentiate received IPTV notification from the content of other received Instant Messages.

An end-user that is interested in a specific program could set up a notification service in order to receive an IPTV notification in an instant message, e.g. five minutes prior to the start of the program.

According to exemplary embodiments of the invention, an IARI (IMS Application Reference Identifier) indicating an IPTV application is included in an Instant Message, wherein the IARI indicates to a receiving User Equipment that the Instant Message is associated with an SCF-node (Service Control Function-node) comprising the IPTV application. According to an exemplary embodiment, the SCF-node corresponds to an IAP (IPTV Application Platform).

According to an exemplary embodiment, the IARI is constructed as "g.3gpp.iari-ref="urn%3Aurn-xxx%3A3gpp-application.ims.iari.iptv-application". According to a preferred embodiment, an OMA Instant Messaging feature tag is included in the Instant message, the tag constructed as "+g.oma.sip-im".

Further, by the IARI included in an Instant Message, a receiving UE is able to determine whether or not the Instant Message includes information in the body of the IM for presenting the IPTV notification.

According to an exemplary embodiment, the body has an agreed format that is readable both by the UE and the SCF. The included information could be an URL/URI to which an application, e.g. a browser, of the receiving UE can go to in order to display an IPTV notification to the user. The web portal associated with that URL may comprise different options to be displayed on the UE, the options associated e.g. with an ongoing IPTV session.

The above-mentioned OMA IM feature tag identifies a specific IMS service, i.e. Instant Messaging, and the IARI identifies a specific IPTV application associated with the SCF.

According to embodiments of the invention, a UE receives an instant message from another device, and detects an application identifier in the instant message. If the UE further detects that this application identifier indicates an IPTV application that is associated with a service control function node, SCF-node, then it retrieves information from the instant message for presenting the IPTV notification. Otherwise, the UE will ignore or cancel the instant message.

According to a preferred embodiment, the UE is IMS-connected, as well as the devices from which the instant messages are received.

According to an embodiment of the invention, the association between the IPTV application and the SCF-node corresponds to the IPTV application being comprised in the SCF-node.

Further, after retrieving the information, preferably from the body of the Instant Message, an IPTV Notification is displayed for the end-user, e.g. by a browser associated with the UE accessing the content of an URL included in the body of the IM.

The Instant Message typically comprises an OMA IM feature tag, and the application identifier is an IARI (IMS Application Reference Identifier).

According to a further embodiment, the retrieval of the information for presenting the IPTV notification involves the UE filtering-out the instant message from other received instant messages, and parsing the body of said filtered-out Instant Message to find the IPTV information, e.g. the above-mentioned URL to a web-page.

Initially, the UE performs a SIP Register, including the IARI and an OMA IM feature tag, in order to be able to receive an IPTV Notification from an SCF-node.

According to an exemplary embodiment, the information for presenting the IPTV notification has a format that is readable by both the UE and the SCF-node. Further, the IPTV notification displayed to the end-user could comprise different selectable options, e.g. to accept, delete, record or snooze the notified IPTV program, and the UE is able to send a response to the SCF-node, the response including a selection of one or more of the different options.

According to embodiments of the invention, a service control function node, SCF-node, comprising an IPTV application, presents an IPTV notification on a User Equipment, by retrieving an application identifier from the IPTV application, and including the application identifier in an instant message sent to the UE. Further, the SCF-node includes information related to the presentation in the instant message, e.g. in the body of the IM.

The UE is preferably IMS-connected, and the SCF-node typically includes an OMA IM feature tag in the instant message.

According to embodiments of the invention, a User Equipment is arranged to present an IPTV-notification. The UE comprises a receiver for receiving an instant message from another IMS-connected device, and a determining unit comprising processing circuits. The determining unit is configured to detect an application identifier in the instant message, and retrieve information from the instant message for presenting the IPTV notification, if determining that the application identifier indicates an IPTV application that is associated with an SCF-node.

Further, the User Equipment is preferably IMS-connectable and/or IPTV-enabled, and comprises a display device for presenting the IPTV notification to a user.

According to an exemplary embodiment, said determining unit comprises a filtering unit, a parsing unit, and a browsing unit.

According to embodiments of the invention, a control function node, SCF-node, is arranged to present an IPTV notification on a preferably IMS-connected User Equipment, and the SCF-node comprises an IPTV application. The SCF node further comprises processing circuits configured to retrieve an application identifier from the IPTV application, and to include said application identifier, as well as information related to the presentation, in an instant message. Further, the SCF-node comprises a transmitter for sending the instant message to the User Equipment.

According to an exemplary embodiment, the SCF-node corresponds to an IAP (IPTV Application Platform).

FIG. 1 is a block diagram schematically illustrating the use of an IARI (IMS Application Reference Identifier), according to embodiments of the invention. The figure shows different exemplary IMS Services, i.e. Multimedia telephony 11, PoC (Push-to-talk over Cellular) 12, and Instant Messaging 13, each identified by a Communication Service Identifier, of which the OMA IM feature tag indicates that the IMS Service is Instant Messaging. FIG. 1 also illustrates applications for each IMS Service, e.g. the applications for Multimedia Telephony illustrated in the boxes denoted "Application 1" and "Def. app. for Multimediate1". The different applications are identified by an Application Reference, i.e. an IARI, which identifies e.g. an IPTV application 42 included in an SCF.

Figure 2:
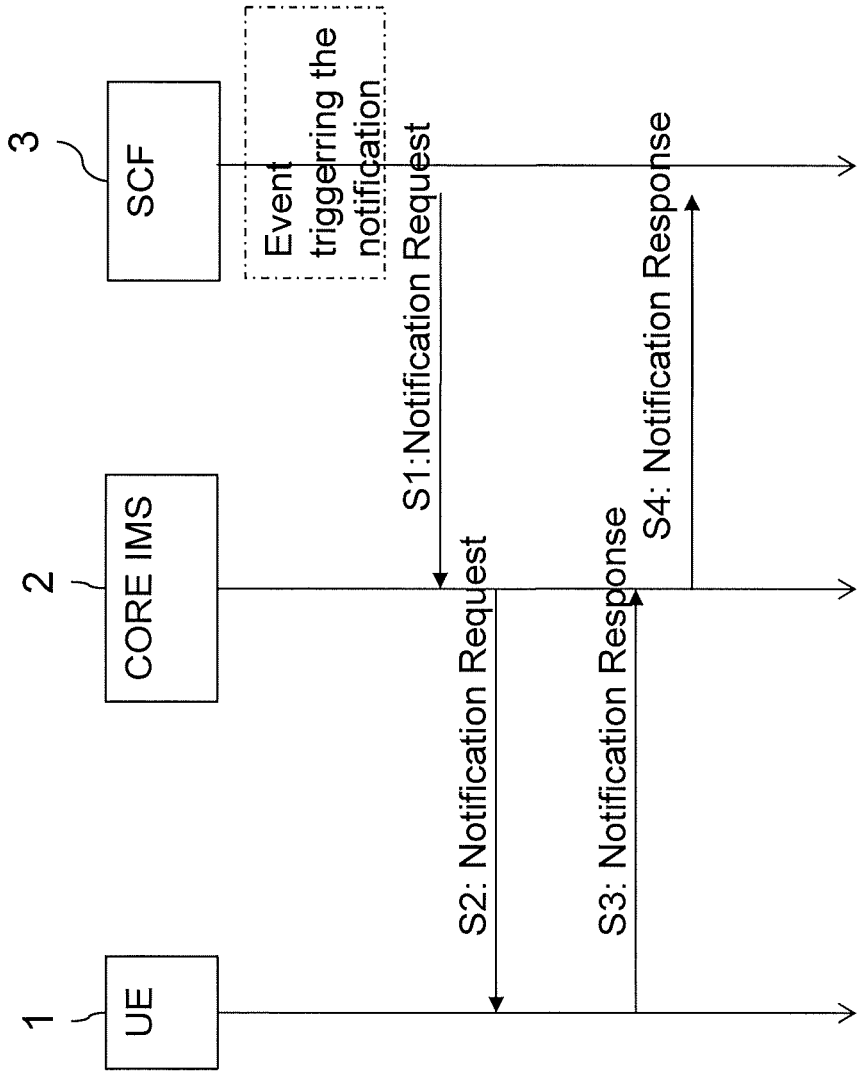
FIG. 2 is a signaling diagram showing the sending of the IPTV Notification, as well as of a response.

FIG. 2 is a signaling diagram showing the sending of the IPTV Notification (request) from a SCF 3 to a UE 1 via the IMS 2, in signals S1 and S2, as well as a response sent from the UE to the SCF, in signals S3 and S4. The IPTV notification could be e.g. a reminder of a TV program, or of other content in a communications network. The IPTV notification/reminder could be triggered e.g. by an event from the EPG (Electronic Program Guide), or simply by the time and date. If the user is logged on on the IPTV system, the reminder could be displayed e.g. on a TV screen of the user, and if the user is not logged in, the reminder could be displayed e.g. as an SMS (Short Message Service) on the UE.

According to exemplary embodiment of the invention, the IPTV Notification includes different options that are selectable by the user. The different options may comprise e.g. to accept (OK), to snooze for a configurable amount of time, and to delete. If the reminder is connected to a linear TV program, one of the options could be to record the program, since linear TV is a program or media information presented according to a predefined schedule.

In a response to the IPTV notification, the user could select one or more of the options.

According to exemplary embodiments, the UE initially performs an SIP REGISTER, including an OMA Instant Messaging feature tag and an IARI indicating an IPTV application in the Contact header, in order to receive an IPTV notification from the SCF. Later, when the SCF sends an IPTV notification in the form of a SIP MESSAGE, it will include the OMA Instant Messaging feature tag and the IARI, indicating the IPTV application, in the Accept-Contact header, and the IMS system can screen the routing of the SIP MESSAGE, based on the SIP REGISTER Contact header information.

When an event takes place that triggers the IPTV notification at the SCF, the notification request will be sent to the UE via the core IMS. An example of such an event is an approaching start of a TV-show, broadcasted at a predefined time. The UE is typically a SIP client, such as e.g. a mobile phone, a set-top box, or a laptop. The notification is sent as an Instant Message comprising the IARI, the OMA IM feature tag and a body. According to embodiments of the present invention, the body comprises information, e.g. an URL, and the text of the body should be interpreted as an URL.

When the UE receives the IPTV notification, it investigates whether the instant message includes the IARI. When the UE detects an IARI indicating an IPTV application that is associated with an SCF-node in the Instant Message, it determines that the IM is sent from the SCF, and not e.g. from another user. Accordingly, the UE knows that this IM is an IPTV notification, and will filter-out this IM, and ignore or cancel any received Instant Messages not comprising the IARI, thereby differentiating this Instant Message from other Instant Messages.

Further, the UE also knows that the body has additional information which both the UE and SCF understand, for example a URL to the notification to be presented to the user. An application, typically a browser, associated with the UE, will retrieve information from the URL to be e.g. displayed or in another way presented for the end-user on the UE. Hence, the body of the notification is parsed for specific information, e.g. for a URL to a webpage for displaying the notification.

As mentioned above, the presentation of the content of the URL may comprise different options, e.g. snooze, record or cancel the requested TV-show. This presentation may be integrated with e.g. an ongoing TV-session.

The UE may respond and select one or more of the presented options by sending a notification response to the SCF via the IMS core.

Figure 5:
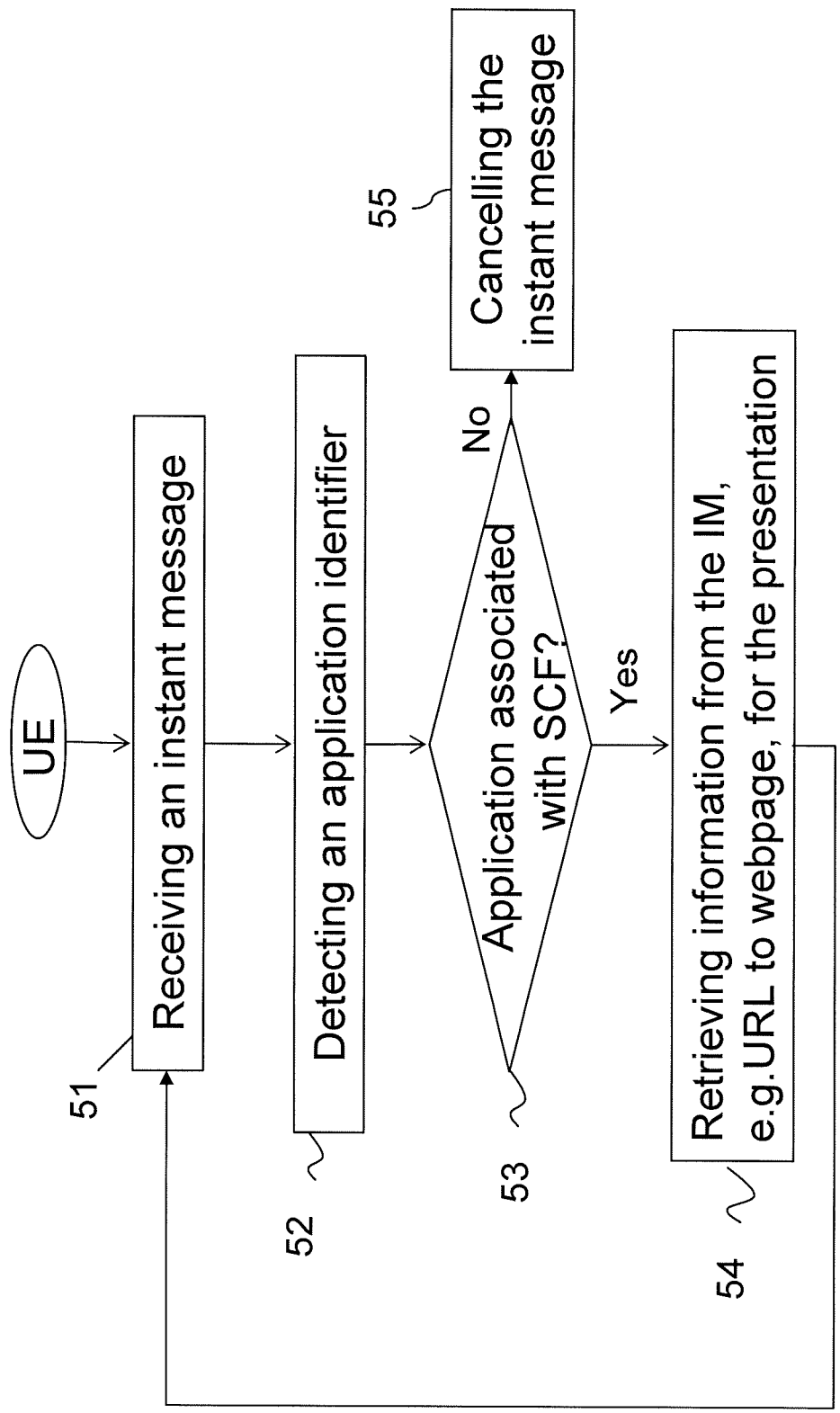
FIGS. 5 and 6 are flowcharts illustrating methods for an UE according to embodiments of the invention.

FIG. 5 is a flowchart illustrating an exemplary method for an UE, and in step 51, the UE receives in Instant Message. In step 52, the UE detects an application identifier, e.g. an IARI (IMS Application Reference Identifier) in the Instant Message. If the UE is able to determine, in step 53, that the application identifier indicates an IPTV application associated with the SCF, i.e. identifies an IPTV application comprised in an SCF-node, then the UE retrieves, in step 54, information from the Instant Message, e.g. an URL, for presenting the IPTV notification. Otherwise, the Instant message is cancelled, in step 55. The steps are repeated for each received Instant Message.

Figure 6:
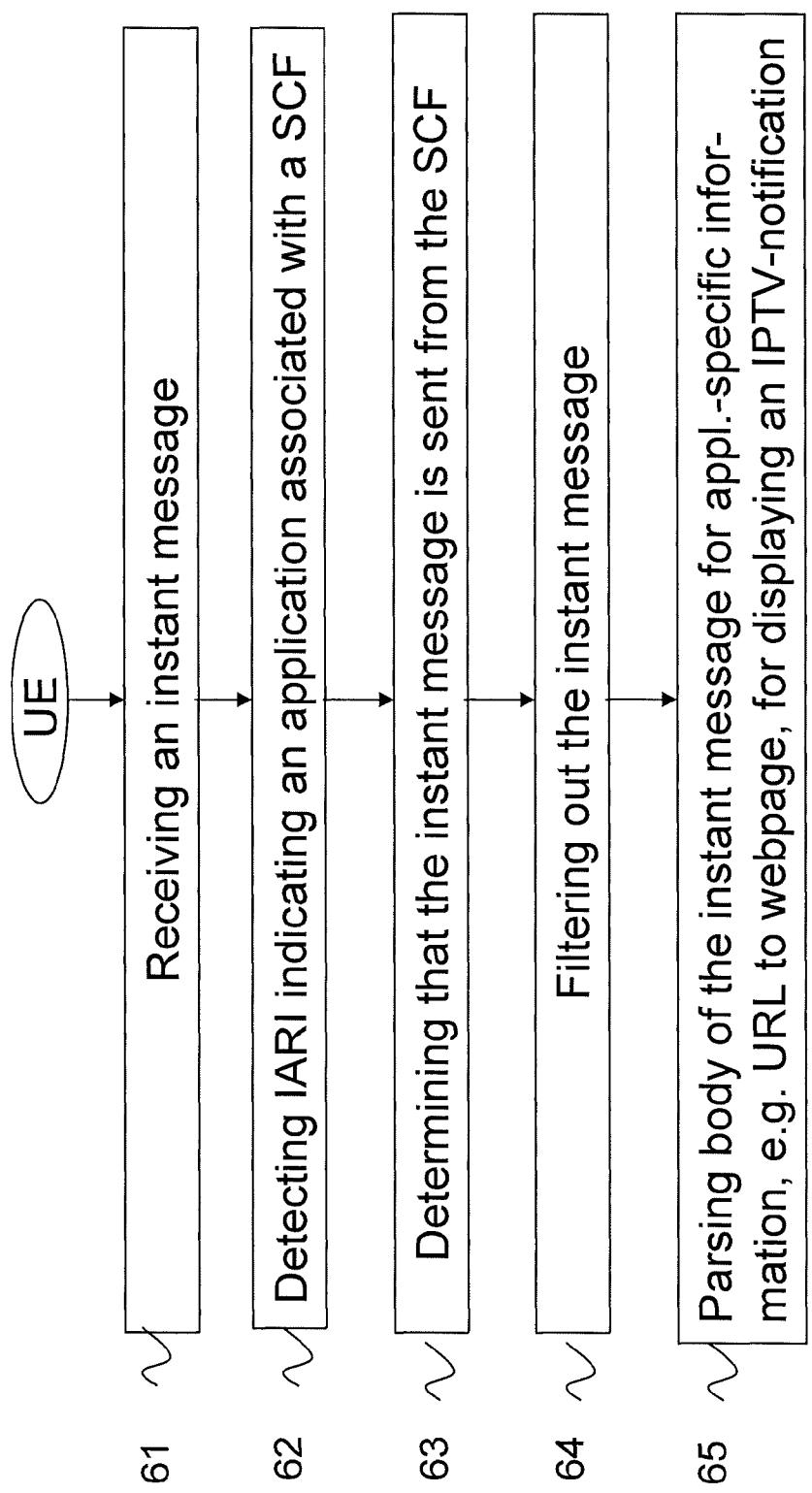

FIG. 6 is a flowchart illustrating a further exemplary method for an UE, according to embodiments of the invention. In step 61, the UE receives the Instant Message, among other Instant messages from other devices, and in step 62, the UE detects an IARI (IMS Application Reference Identifier) indicating an IPTV application associated with the SCF-node in the IM. Consequently, in step 63, it can be determined that the IM is sent from said SCF-node, and comprises an IPTV notification, since the IARI identifies an IPTV application comprised in the SCF-node.

In step 64, the UE filters-out the Instant Message comprising the IARI, and ignores, or cancels, other IMs received from other devices, since those IMs are not sent from the SCF, and does not comprise any IPTV notification. Thereafter, in step 65, the UE parses the body of the IM for information related to the presentation, e.g. an URL to a webpage, which can be accessed by a browser in the UE, and the content presented to the user.

Figure 7:
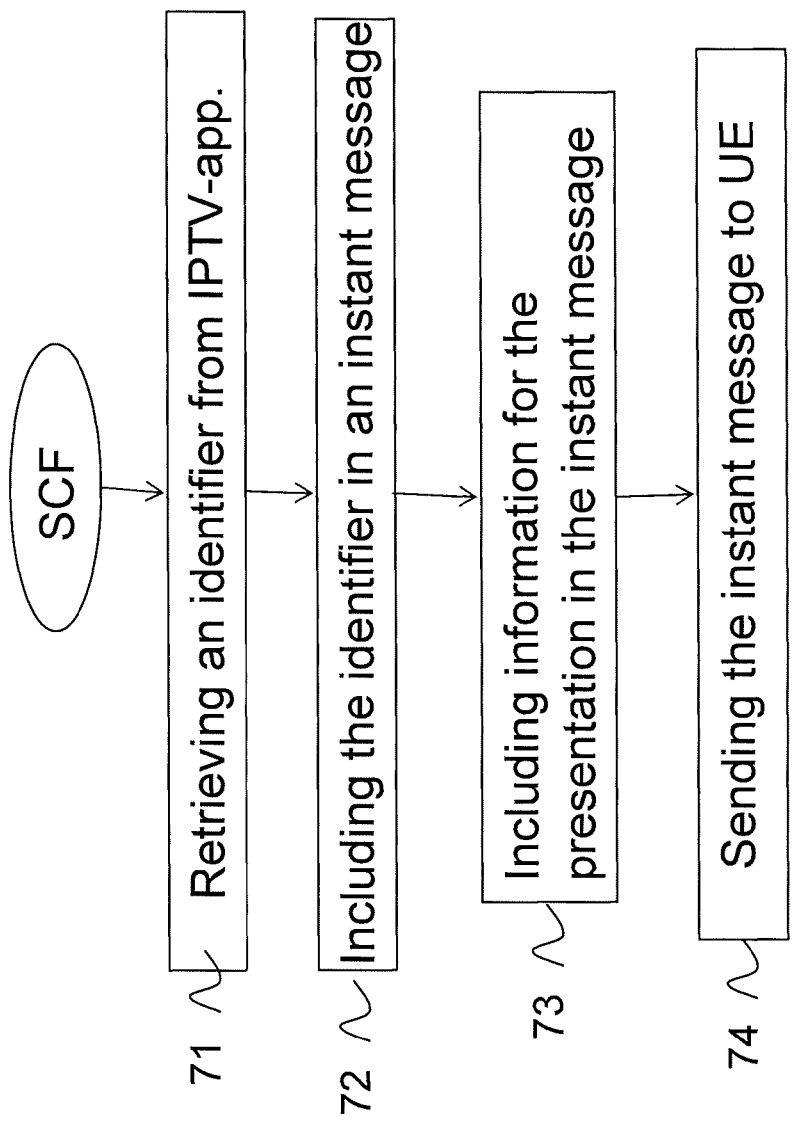
FIGS. 7 and 8 are flowcharts illustrating methods for an SCF, according to embodiments of the invention.

FIG. 7 is a flowchart illustrating an exemplary method for an SCF. In step 71, the SCF retrieves an application identifier, e.g. an IARI, from an IPTV application contained in the SCF, and includes the application identifier in an Instant Message, in step 72. In step 73, the SCF includes information for the presentation of IPTV notification in the IM, and sends the IM to the UE, in step 74.

Figure 8:

FIG. 8 is a flowchart illustrating a further exemplary embodiment of the method for the SCF. In step 81, the SCF retrieves an IARI from the IPTV application, and includes the IARI in an IM, in step 82. An OMA IM feature tag is included in the IM in step 83. In yet a further step 84, application-specific information is included in the body of the IM, wherein the format is understood by both the UE and the SCF. In step 85 the IM notification is sent to the devices of the user.

FIG. 3 is a block diagram schematically illustrating an exemplary UE, comprising a receiver 31 for receiving an Instant Message. The UE is further provided with a determining unit 32 comprising processing circuits 33, the determining unit configured to detect that a received IM comprises an application identifier, and to retrieve information from such an Instant Message for presenting the IPTV notification, if it is determined that the application identifier is associated with an SCF-node. Further, the UE comprises a display 34.

Figure 4A:
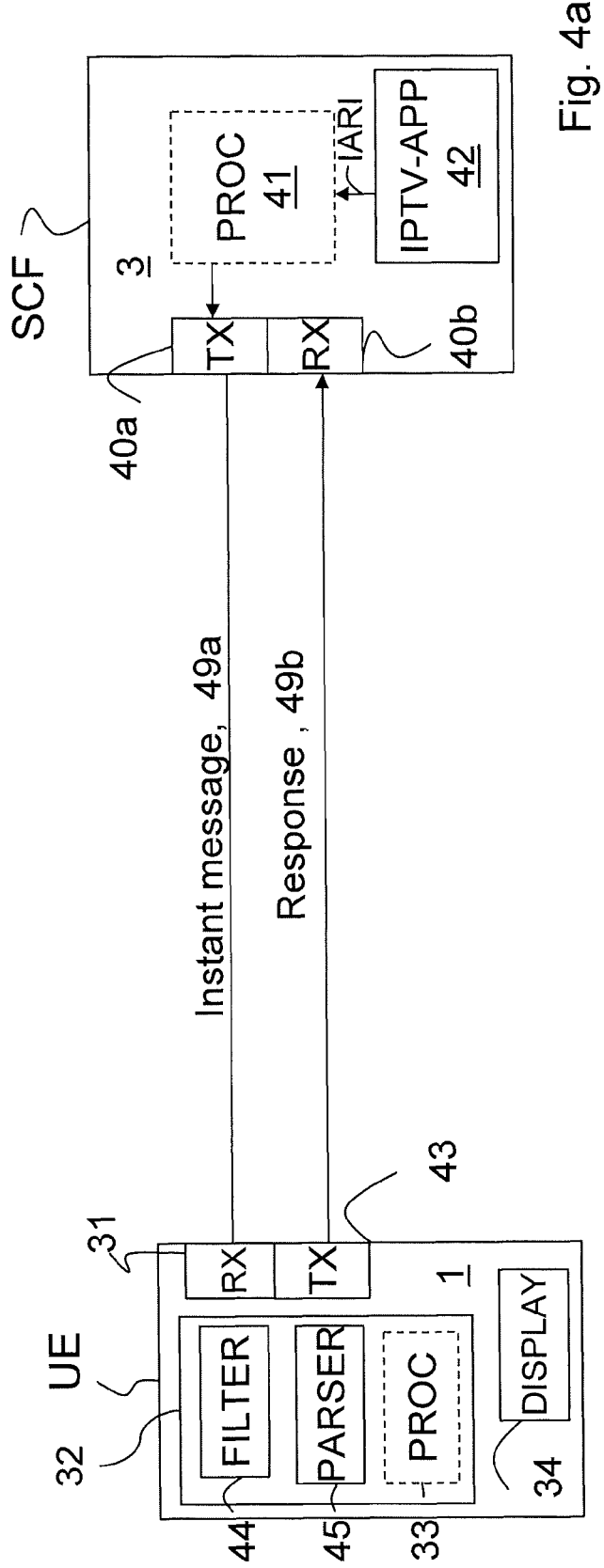
FIG. 4a is a block diagram schematically illustrating a UE and an SCF, according to an exemplary embodiment of the invention.
Figure 4B:
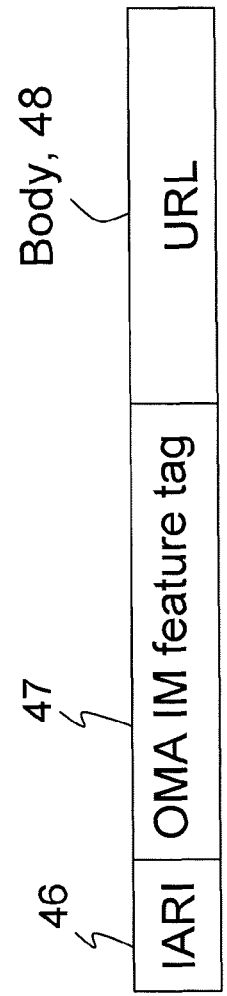
FIG. 4b illustrates an exemplary content of an Instant Message.

FIG. 4a is a block diagram schematically illustrating a UE 1 and an SCF-node 3, according to an exemplary embodiment of the invention, and FIG. 4b illustrates exemplary content of an Instant Message, comprising an IARI 46 and an OMA IM feature tag 47 in a contact header, and an URL in the body 48.

The SCF comprises an IPTV application 42, which is identified with an IARI. The SCF further comprises suitable processing circuits 41 for retrieving the IARI, and for including the IARI 46 and the OMA IM feature tag 47 in an Instant Message 49a, of which the body 48 has a format that is readable by both the UE and the SCF, for example an URL to a web portal comprising IPTV-related information.

Further, the SCF comprises a transmitter 40a for sending the Instant Message (IM) 49a. The IM is received at a receiver 31 at the UE. The UE is further provided with a determining unit 32, comprising suitable processing circuits and a filtering unit 44 for filtering out Instant Messages comprising IPTV notifications, based on whether the Instant Message includes an IARI indicating an IPTV application comprised in an SCF-node. The filtered-out IMs are passed to a parsing unit 45, which is configured to find an URL indicated in the body. The UE may further comprise a browsing unit (not illustrated in the figure) for accessing the URL for display, e.g. on the display 34 on the UE. Hence, according to an exemplary embodiment, the determining unit is configured to know that the body 48 of the IM 49a includes an URL along with text, if an IARI indicating an IPTV application is included in the Instant Message. Since both text and an URL are included, the IPTV notification can be received by both IPTV and non-IPTV clients.

The UE further comprises a transmitter 43, e.g. for sending a response 49b to an Instant Message comprising an IPTV notification, and the SCF comprises a receiver 40b, e.g. for receiving such a response.

Thus, by the SCF-node including the IARI indication an IPTV application in the Instant Message, a receiving UE can differentiate IMs received from the SCF from those received from other devices, which enables the user to select the IMs that contains an IPTV notification, and cancel other IMs received by from other devices.

The entities and units described above with reference to the figures are logical units, which do not necessarily correspond to separate physical units.

Furthermore, the above mentioned and described embodiments are only given as examples and should not be limiting to the present invention. Other solutions, uses, objectives, and functions within the scope of the invention as claimed in the accompanying patent claims should be apparent for the person skilled in the art.

Abbreviations
IARI=IMS Application Reference Identifier
IPTV=Internet Protocol TeleVision
SCF=Service Control Function
IM=Instant Message
OMA=Open Mobile Alliance

The invention claimed is:

1. A method for User Equipment, UE, of presenting an IPTV notification, the method comprising:
   receiving an instant message from another device;
   detecting, in the instant message, an application identifier that is associated with a service control function node, SCF-node;
   determining that the instant message is sent from the SCF-node and that the instant message is an IPTV notification; and
   filtering out the instant message from other received instant messages using the application identifier associated with the SCF-node.

2. A method according to claim 1, wherein the User Equipment is IMS-connected.

3. A method according to claim 1, comprising cancelling a received instant message, if no application identifier indicating an IPTV application associated with the SCF-node is detected in the instant message.

4. A method according to claim 1, the method further comprising displaying the IPTV notification.

5. A method according to claim 1, wherein the instant message further comprises an OMA IM feature tag.

6. A method according to claim 1, wherein the application identifier is an IARI (IMS Application Reference Identifier) that identifies an IPTV application comprised in the SCF-node.

7. A method according to claim 1, further comprising retrieving information from the instant message, the information for presenting the IPTV notification.

8. A method according to claim 7, wherein said information is an URL, which is accessible by a browser associated with the UE.

9. A method according to claim 6, preceded by the UE performing a SIP Register, including the IARI and an OMA IM feature tag.

10. A method according to claim 1, wherein the information for presenting the IPTV notification has a format that is readable by both the UE and the SCF-node.

11. A method according to claim 1, wherein the information comprises different selectable options.

12. A method according to claim 11, wherein the selectable options comprises to accept, delete, record and snooze a notified IPTV content.

13. A method according to claim 11, the method further comprising:
   sending a response to the SCF-node, the response comprising a selection of one or more of the different options.

14. A User Equipment arranged to present an IPTV-notification, the User Equipment comprising:
   a receiver for receiving an instant message from another IMS-connected device;
   one or more processing circuits configured to:
   detect, in the instant message, an application identifier that is associated with a service control function node, SCF-node
   determine that the instant message is sent from the SCF-node and that the instant message is an IPTV notification; and
   filter out the instant message from other received instant messages.

15. A User Equipment according to claim 14, wherein the User Equipment is arranged to be IMS-connectable.

16. A User Equipment according to claim 14, comprising a display device for presenting the IPTV notification to a user.

17. A User Equipment according to claim 14, wherein the one or more processing circuits is configured to retrieve information from the instant message for presenting the IPTV notification.

18. A User Equipment according to claim 14, wherein the one or more processing circuits comprises a browser.

19. A User Equipment according to claim 14, wherein the User Equipment is IPTV-enabled.

20. A User Equipment according to claim 14, wherein the application identifier is an IARI (IMS Application Reference Identifier) that identifies an IPTV application comprised in the SCF-node.

21. A User Equipment according to claim 14, wherein the information for presenting the IPTV notification has a format that is readable by both the UE and the SCF-node.

22. A User Equipment according to claim 14, wherein the information comprises different selectable options, and wherein the one or more processing circuits is configured to send a response to the SCF-node, the response comprising a selection of one or more of the different options.

23. A method according to claim 1, wherein the application identifier identifies an application comprised in the SCF-node.

24. A User Equipment according to claim 14, wherein the application identifier identifies an application comprised in the SCF-node.

* * * * *